United States Patent
Cannon et al.

(10) Patent No.: US 6,885,739 B2
(45) Date of Patent: Apr. 26, 2005

(54) ADAPTIVE CALLER ID STORAGE BASED ON ANSWER STATUS OF INCOMING CALL

(75) Inventors: Joseph M. Cannon, Harleysville, PA (US); James A. Johanson, Macungie, PA (US); Philip D. Mooney, North Wales, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/434,992

(22) Filed: Nov. 5, 1999

(65) Prior Publication Data

US 2002/0114436 A1 Aug. 22, 2002

(51) Int. Cl.[7] .......................... H04M 1/56; H04M 15/06
(52) U.S. Cl. ........................... 379/142.01; 379/142.04; 379/142.17
(58) Field of Search ............................ 379/88.19, 88.2, 379/88.21, 93.23, 142.01, 142.04, 142.06, 142.16, 142.17, 120, 127.01

(56) References Cited

U.S. PATENT DOCUMENTS

| | | | | |
|---|---|---|---|---|
| 5,446,785 A | * | 8/1995 | Hirai | |
| 5,467,385 A | * | 11/1995 | Reuben et al. | |
| 5,859,903 A | * | 1/1999 | Lee | 379/157 |
| 5,883,942 A | * | 3/1999 | Lim et al. | |
| 6,134,308 A | * | 10/2000 | Fallon et al. | |
| 6,141,058 A | * | 10/2000 | Lagoni et al. | |
| 6,215,859 B1 | * | 4/2001 | Hanson | |
| 6,249,579 B1 | * | 6/2001 | Bushnell | |
| 6,282,275 B1 | * | 8/2001 | Gurbani et al. | |
| 6,298,128 B1 | * | 10/2001 | Ramey et al. | |
| 6,341,160 B1 | * | 1/2002 | Tverskoy et al. | |

FOREIGN PATENT DOCUMENTS

EP            0844773 A2  *  5/1998

* cited by examiner

Primary Examiner—Duc Nguyen

(57) ABSTRACT

A telephone or adjunct Caller ID device adaptively stores Caller ID data based, for example, on a handling status of an incoming call. In a particular example, a telephone or Caller ID device includes a memory adapted to store Caller ID data associated with an incoming call, and a processor adapted to affect storage of the Caller ID data based on a status of the incoming call, such as whether the incoming call is answered. In an alternative embodiment, a method of receiving an incoming telephone call includes the steps of receiving Caller ID data associated with the incoming telephone call, evaluating a status of the incoming telephone call, and making a Caller ID storage decision based on the status of the incoming telephone call. The decision may be based on handling of the incoming telephone call, such as whether the incoming telephone call is answered, or whether it is answered by a person. The decision may be made proximate in time to the receipt of the incoming telephone call, or in response to a circumstance, such as in response to receipt of an indication that the memory is more full than a threshold, or in response to user input. For example, the decision may be made in conjunction with other storage decisions regarding other Caller ID data in response to the circumstance.

8 Claims, 3 Drawing Sheets

ADAPTIVE CALLER ID STORAGE BASED ON ANSWER STATUS OF INCOMING CALL

FIELD OF THE INVENTION

The invention is directed to the field of telephony, and in particular to the area of Calling Number Identity (Caller ID) and the storage of and management of stored Caller ID data.

BACKGROUND OF THE INVENTION

Caller ID is a feature whereby data is associated with an incoming telephone call to provide the called party some information regarding the calling party, in particular, information regarding the calling party's telephone. The called party typically has an adjunct box, or a "feature-phone" with the adjunct box functionality incorporated therein, with a liquid crystal display that provides the called party with the information as the incoming call is being received. In the United States, the Caller ID information is typically provided between the first ring signal and the second ring signal, as described in Bellcore standard GR-30-CORE, incorporated herein by reference.

Alternatively, if the called party is engaged in a first telephone call while a second telephone call is being received, the called party may receive Caller ID with Call Waiting (CID/CW, or Type II Caller ID) information during a muting period as governed by Bellcore standard GR-30-CORE, incorporated herein by reference, or alternatively according to the procedure defined in U.S. Pat. No. 5,943,407, incorporated herein by reference. Similar standards, albeit not necessarily identical to the U.S. standards, are applicable in other countries.

An attribute of Caller ID is that it enables a called party to screen incoming calls by determining, based on the information presented, whether the called party wants to take time to engage in a conversation with the incoming caller, or to have the call go unanswered or forwarded to an answering machine. An additional advantage is that the called party can benefit from a record of the stored Caller ID data to use as a simple look-up device when returning a call to the incoming caller.

For example, the called party can scroll through the Caller ID data accumulated for a plurality of incoming calls by activating one or more keys of a telephone keypad while observing information presented on the Caller ID display. When the information that the called party is looking for appears on the display, the called party can now place a return telephone call by dialing the displayed number (by activating the corresponding keys), or in some telephones may simply press a key associated with the Caller ID display to automatically cause the displayed telephone number to be called.

The opportunity to scroll through the stored telephone numbers as part of placing an outgoing call may be habit-forming, especially for a user of a Caller ID device that enables an outgoing call to be automatically initiated upon the activation of a single key when the target telephone number is displayed. One proposed improvement to the existing technology is to make it accessible remotely, such that a user may call in to the user's telephone to review stored Caller ID data associated with one or more incoming calls, and to subsequently initiate an outgoing call to a particular party. Such an improvement tends to increase the reliance of the user on the Caller ID device.

A problem with the reliance on the stored Caller ID data as a part of the process of placing an outgoing call is that the memory holding the Caller ID data is limited. It can thus be frustrating to a user if the user is attempting to place an outgoing call, such as a return call, to a party that has previously called the user, but the user cannot place the call in the way the user has grown accustomed to because the target party's Caller ID information is not stored in the memory due to memory capacity limitations. There is therefore a need for an intelligent approach to managing a Caller ID memory to increase the utility of the Caller ID feature.

SUMMARY OF THE INVENTION

This need is met by a telephone or adjunct Caller ID device that adaptively stores Caller ID data based, for example, on a handling status of an incoming call. In a particular example, a telephone or Caller ID device includes a memory adapted to store Caller ID data associated with an incoming call, and a processor adapted to affect storage of the Caller ID data based on a status of the incoming call, such as whether the incoming call is answered.

In an alternative embodiment, a method of receiving an incoming telephone call includes the steps of receiving Caller ID data associated with the incoming telephone call, evaluating a status of the incoming telephone call, and making a Caller ID storage decision based on the status of the incoming telephone call. The decision may be based on handling of the incoming telephone call, such as whether the incoming telephone call is answered, or whether it is answered by a person. The decision may be made proximate in time to the receipt of the incoming telephone call, or in response to a circumstance, such as in response to receipt of an indication that the memory is more full than a threshold, or in response to user input. For example, the decision may be made in conjunction with other storage decisions regarding other Caller ID data in response to the circumstance.

BRIEF DESCRIPTION OF THE DRAWING

Objects and advantages of the invention will be apparent to one of skill in the art upon review of the following detailed description in light of the drawing, wherein.

DETAILED DESCRIPTION

Figure 1:
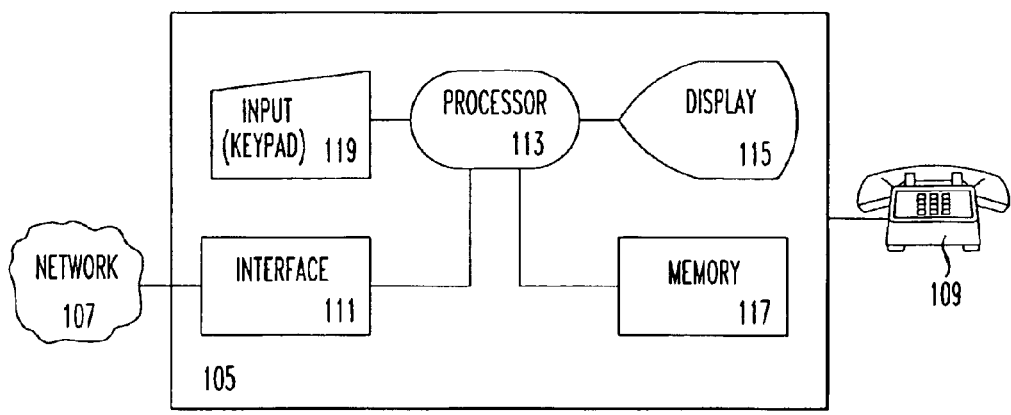
FIG. 1 is a simplified block diagram of a Caller ID adjunct box adapted to operate according to the invention.

FIG. 1 is a simplified block diagram of a Caller ID device 105 incorporated, for example, into an adjunct box, and coupled to a network 107 and a telephone 109. The Caller ID device 105 includes an interface 111 to the network 107. For example, the interface 111 may be a telephone line interface (TLI) for an exemplary embodiment wherein the network 107 is a public switched telephone network (PSTN).

The Caller ID device 105 also includes a processor 113, such as a digital signal processor (DSP) or microcontroller, a display 115, such as a liquid crystal display (LCD), a memory 117, and an input unit 119, such as a keypad. At the block diagram level shown in FIG. 1, Caller ID device 105 may appear similar to a conventional adjunct box based Caller ID device. However, according to the invention, the operations of processor 113, display 115 and/or memory 117 are improved to increase the utility of the Caller ID feature. In particular, they are improved to make better use of the memory 117 and/or to make the display 115 more user friendly.

In one embodiment according to the invention, the processor 113 is adapted to determine if the incoming call is answered. Upon such a determination, the processor 113 is adapted to take a particular action that differs from that taken by a conventional Caller ID device. For example, the processor 113 may be adapted to elect not to make any record in memory 117 of such a call, or to make a modified record.

Figure 2:
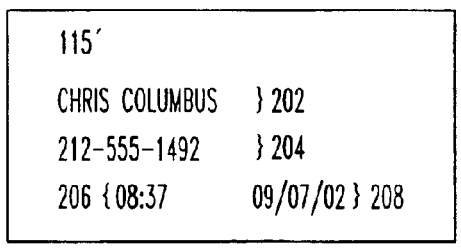
FIG. 2 is a diagram of an exemplary image appearing on a display of the Caller ID device of FIG. 1.

FIG. 2 provides an exemplary image of the contents of display 115, identified as 115', when an incoming call is being received, or when the record of the incoming call is being retrieved by a user, such as by activating one or more keys of the keypad 119. In this particular example, the display 115' contains a first field 202 that is adapted to display a name of a party associated with the incoming caller's telephone. This may in fact be the name of the incoming caller, or may alternatively be merely the name of the person associated with the telephone, as someone else, such as a friend or family member, is actually placing the call.

A second field 204 includes the telephone number of the calling telephone. A third field 206 displays the time that the incoming call is being received, if the display is provided in real time as the call is arriving, or the time that the call was received if the display is provided in response to user input as part of a process of reviewing the contents of memory 117. Similarly, a fourth field 208 displays the date associated with the arriving or stored incoming call. Additional fields may also be incorporated into the image of display 115'.

In a conventional Caller ID device, the information on display 115' is provided to the user as an image while the incoming call is being received, is stored in the memory, and is subsequently displayed to the user when the user is recalling or scanning through the stored Caller ID information. This is problematic as it unnecessarily uses memory space and annoys the user by forcing the user to scan through potentially meaningless data. This problem can be especially disconcerting if the data associated with a large number of incoming telephone calls are no longer relevant to the user, such as is the case, for example, if the user desires to return only unanswered calls but is troubled with filtering through data associated with many answered calls.

Figure 3:
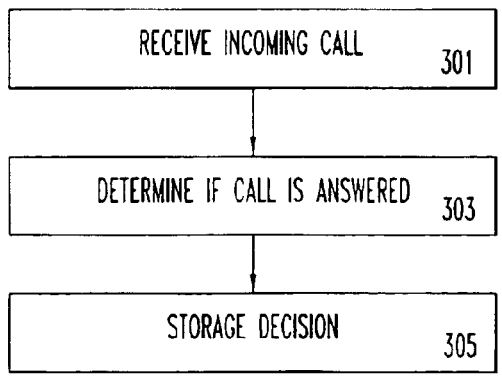
FIG. 3 is a simplified operational flowchart of an exemplary process according to the invention.

FIG. 3 provides a simple operational flowchart for one embodiment according to the invention. At step 301, an incoming telephone call is received and accompanied by Caller ID data. At step 303, a determination is made as to whether the incoming call is answered, and at step 305 a storage decision is made regarding the Caller ID data.

The determination at step 303 may be based, in one embodiment, on a determination that the called party's telephone does not transition to an off-hook status while ring signals associated with the incoming call are received, and that the ring signals terminate as a result of the incoming caller ending the attempt to contact the called party (or being forwarded to a central office based answering service). Alternatively, if the called party has an answering machine coupled to or integrated into the called party's telephone, which will result in an off-hook transition even if the called party does not answer the call, the determination at step 303 may include an evaluation as to whether the incoming call is answered by a real person or by the answering machine.

This analysis may be as simple as the processor 113 being aware of the signal associated with the issuance of an outgoing greeting message, such that the processor is thus aware of the fact that the incoming call is answered by the party when there is no command for an OGM. Alternatively, for situations where the called party has a telephone answering device that is separate from the Caller ID device, this analysis may be as complicated as the processor sensing for the issuance of a particular sound, such as a "beep", that issues from the answering device to prompt the incoming caller to leave a message.

The storage decision 305 may be a decision to not store the Caller ID data if the incoming call is answered, and to store the Caller ID data if the incoming call is not answered. Alternatively, the decision may be to store the Caller ID data regardless of whether the call is answered, but to add a flag to identify records associated with answered calls so that any future display or other message handling steps may take this fact into consideration. Similarly, the decision to store and/or to flag may be based on whether the call is answered by a person or by an answering machine.

Figure 4:
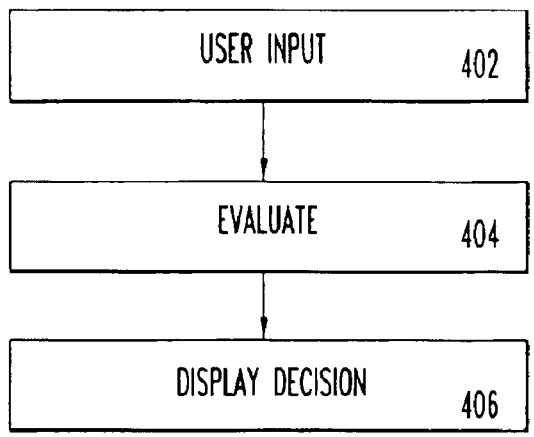
FIG. 4 is another simplified operational flowchart of another exemplary process according to the invention.

If the Caller ID data are stored and flagged to indicate those messages that are answered, subsequent processing may act on this information. For example, according to the process of FIG. 4, the fact that a call was answered may affect the display of related Caller ID data when a user of the device is subsequently reviewing the data. At step 402 the user provides input, such as via the keypad 119. The input informs the processor 113 of the user's desire to review Caller ID data.

If configured according to this embodiment, the processor evaluates, at step 404, the stored records as part of retrieving them, to determine if any of the records are flagged as being associated with an answered call. The processor then makes a display decision at step 406 wherein the processor elects to not display any records associated with calls that were answered. If the user is attempting to return one or more unanswered calls, and the device is thus configured, the user is able to scroll through only the Caller ID data associated with unanswered calls, advantageously eliminating any clutter or confusion associated with wading through a plurality of records associated with answered calls. Of course, depending on the needs of the user, the device may alternatively be configured to only display Caller ID data associated with answered calls.

Figure 5:
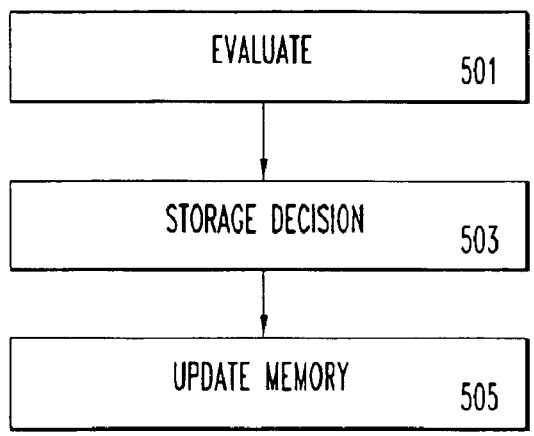
FIG. 5 is yet another simplified operational flowchart of yet another exemplary process according to the invention.

The aforementioned embodiments describe the intelligent management of Caller ID messages by taking unique action at the time the messages are stored, at the time messages are retrieved, or a combination of both. In an alternative embodiment depicted in FIG. 5, an intermediate point in time may be preferred. For example, it may be preferable to automatically perform the evaluation of the answered status at the time the Caller ID data is being stored, as described with respect to the embodiment of FIG. 3, but it may also be preferred that the Caller ID data always be stored, and the evaluation is performed at a subsequent point in time.

Figure 6:
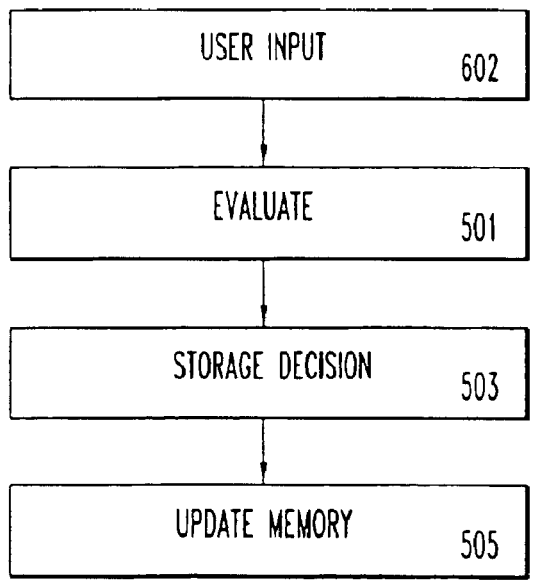
FIG. 6 is still another simplified operational flowchart of an exemplary process according to the invention.

Thus, for example, the Caller ID data may be stored in the normal manner, as part of the receipt of an incoming telephone call. Then, at step 501, presumably at a subsequent point in time, such as when telephone 109 is in an on-hook condition, one or more records are retrieved and evaluated. At step 503 a storage decision is made, and at step 505 the memory 117 is updated to reflect the storage decision. The steps described with respect to the embodiment of FIG. 5 may occur automatically, such as on a periodic basis, such as once per day, week, month, etc., or may occur after the completion of each incoming telephone call and the corresponding storage of the record associated therewith. Alternatively, as depicted in the simplified flowchart of FIG. 6, the process may occur based on user input, such as, for example, user activation of one or more particular keys of keypad 119 during step 602. For example, the user may provide input to "delete all answered messages," at which point the steps 501–503 will be carried out to evaluate the stored records and update the memory. Alternatively, of course, the user input could be to "delete all unanswered messages", at which point the appropriate steps will occur.

Figure 7:
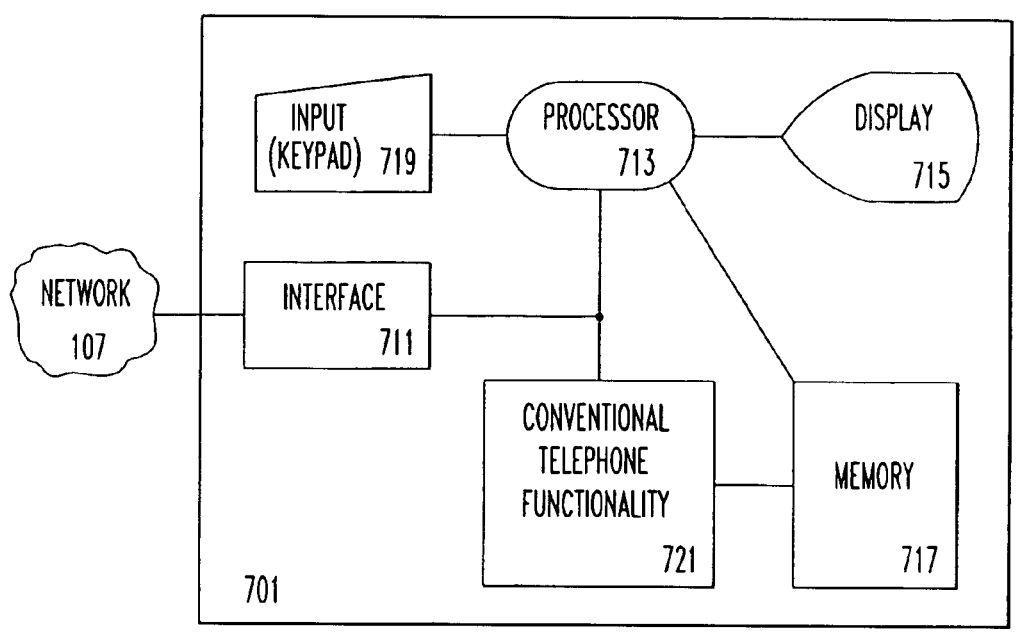
FIG. 7 is a simplified block diagram of a telephone incorporating the elements of a Caller ID device according to the invention.

The aforementioned embodiments are described with respect to an adjunct box 105 of FIG. 1. Alternatively, the functionality of the Caller ID device may be incorporated into a telephone, such as a "feature phone" as shown, for example, as telephone 701 of FIG. 7, which includes interface 711, processor 713, display 715, memory 717 and keypad 719, which may be similar to and provide the same functionality as the corresponding elements of the adjunct box 105. However, each of the elements 711–719 may also perform other telephone functions.

For example, the keypad 719 may function as both a telephone keypad and as a keypad for providing input for managing Caller ID. Similarly, the memory 711 may store Caller ID data and may also store additional information, such as speed dial information or answering machine information, such as outgoing or incoming messages. Also, the processor 713 may be adapted to perform control functions for the telephone as well as for the Caller ID portion thereof. Telephone 701 also includes conventional telephone functionality 721 for use in performing conventional telephone functions.

Based on an understanding of these various embodiments, one of skill in the art is likely to conceive of alternative embodiments that are not specifically enumerated here, but that are clearly within the scope of the invention. For example, the analysis of the data may be based not only on the answered status of the incoming call associated therewith, but may also be based on other factors. The analysis may, for example, also be based on whether the incoming Caller ID data contains information identifying the incoming caller or the incoming caller's telephone number. If these data are blocked by the incoming caller, then this fact may also play into the decisions of whether to store the data, flag the data or display the data. Similarly, the analysis may include factors such as the length of the call, the area code or Caller ID data of the call, and a determination of whether the Caller ID data already is stored.

What is claimed is:

1. A telephone device, comprising:

current caller Caller ID memory adapted to receive incoming Caller ID data associated with an incoming call;

a module to determine if a telephone call was answered by a person;

a Caller ID log adapted to contain a plurality of Caller ID data; and a processor adapted to store only a portion but not all of said received Caller ID data into said Caller ID log only if said incoming call was answered by a person.

2. A telephone device, comprising:

current caller Caller ID memory adapted to receive incoming a Caller ID data associated with an incoming call;

a module to determine if a telephone call was answered by a person;

a Caller ID log adapted to contain a plurality of Caller ID data; and a processor adapted to store said received Caller ID data into said Caller ID log only if said incoming call went unanswered by a person, and only when said Caller ID log is more full than a predetermined threshold.

3. A telephone device according to claim 1, further comprising:

a telephone adapted for connection to a telephone network.

4. A method of receiving an incoming telephone call, comprising:

receiving Caller ID data associated with the incoming telephone call;

determining if the incoming telephone call has been answered by a person; and storing only a portion but not all of said received Caller ID data into a Caller ID log if said incoming call was answered by a person.

5. A method of receiving an incoming telephone call as recited in claim 4, wherein:

said storing is performed in response to user input.

6. A method of receiving an incoming telephone call, comprising:

receiving Caller ID data associated with the incoming telephone call;

determining if the incoming telephone call has been answered by a person;

determining that a Caller ID log is more full than a predetermined threshold; and if said Caller ID log is more full than said predetermined threshold, storing said received Caller ID data into a Caller ID log only if said incoming telephone call went unanswered by a person.

7. A method of receiving an incoming telephone call as recited in claim 5, wherein:

said user input is activation of a keypad associated with a Caller ID device.

8. A method of receiving an incoming telephone call as recited in claim 7, further comprising:

storing a message associated with said incoming telephone call.

\* \* \* \* \*